Patented Apr. 18, 1950

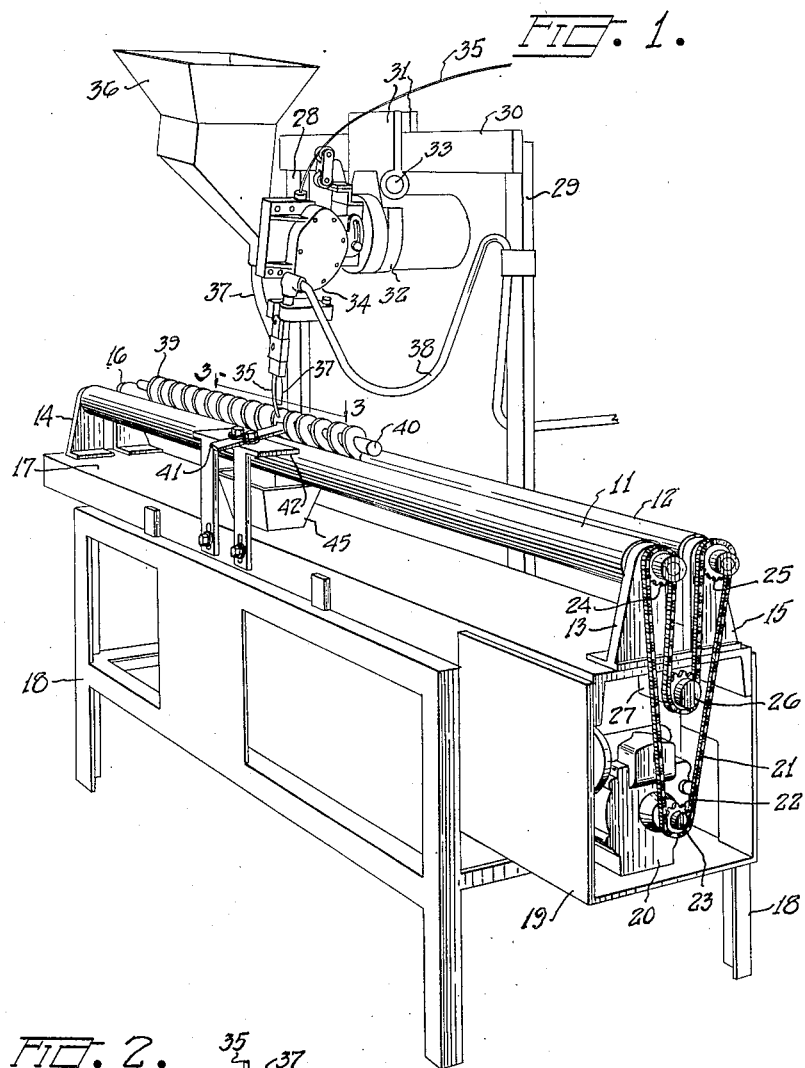

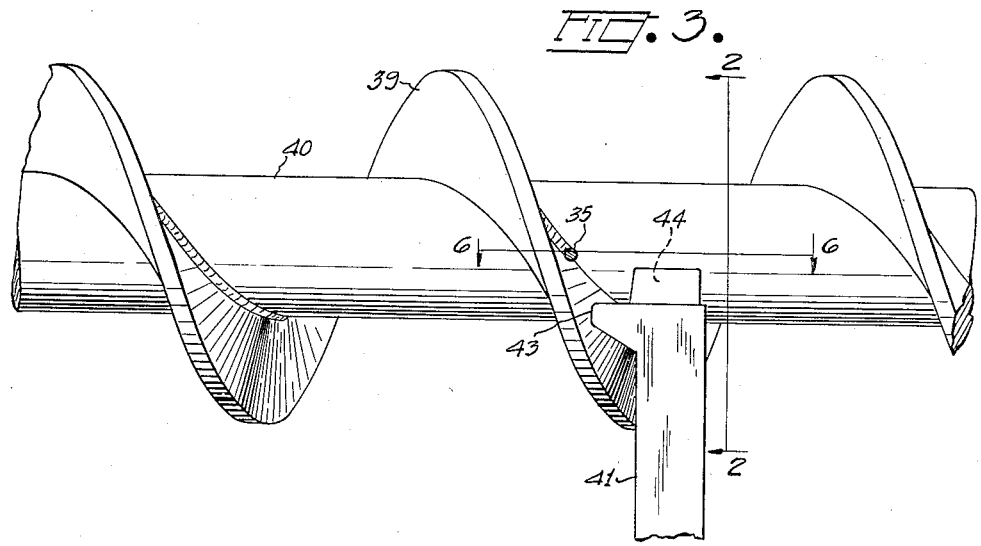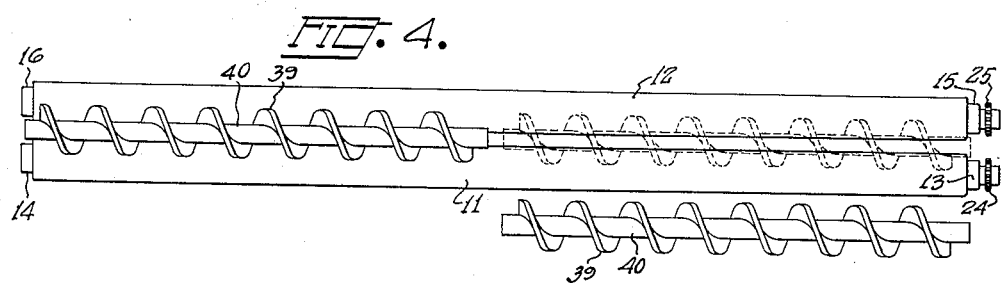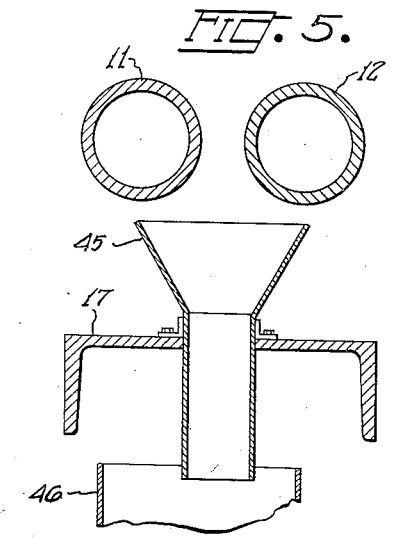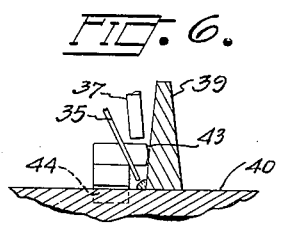

2,504,921

UNITED STATES PATENT OFFICE 2,504,921

WORM WELDING DEVICE

Haskell C. Carter, Portland, Oreg., assignor to Iron Fireman Manufacturing Company, Portland, Oreg.

Application June 1, 1949, Serial No. 96,447

4 Claims. (Cl. 219—8)

This invention relates generally to automatic apparatus for electric welding and more particularly to automatic apparatus for locating and progressively feeding two parts to be welded together so that at all times the joint to be welded will be properly located with respect to a welding head and at the same time the joint will be continuously and uniformly advanced under the welding head. The form of the invention illustrated is especially adapted to the welding of the helical flight to the core of a worm such as is used for moving coal in a coal conveyor.

The prior art has developed several very satisfactory welding heads or that part of the apparatus which supplies and regulates the welding current and which also controls the feed of the supply of welding rod and welding flux to the point of welding. The welding head shown herewith is only indicated as typical and is no part of my invention.

The prior art has developed a way of welding the flight to the worm which consists of tack welding the flight in proper location on the core, journalling the core in a worm rotating fixture and guiding a welding head axially of the worm by means of guiding rolls on the welding head carriage contacting the flight of the worm to be welded. With this method a definite set up of the equipment is required for each section of worm to be welded.

The prior art has also developed a way of welding a spiral fin to a hollow tube in which the tube is carried on a mandrel along which the tube is caused to progress axially as the mandrel and tube are rotated. In this case, the welding head is stationary. Here again each section of finned tube to be welded required a separate set up of the equipment.

In my particular improvement over the prior art which improvement is adapted to welding a spiral flight or fin on either a solid or hollow core, I support the core of the worm to be welded within the spiral flight at its desired axial location and support the flight externally on a pair of troughing rolls both turning in a direction opposite to the desired direction of rotation of the worm to be welded. A combined guiding and hold down arm is so fixed to the framework of the troughing roll structure that as the troughing rolls are rotated and therefore the worm is rotated, the worm will be progressed axially due to the contact of the rotating worm flight on the arm and at the same time the arm will prevent the worm from walking out of its proper position on the rolls. A stationary welding head in a fixed predetermined location welds the flight to the core as they progress under it. The electric current is conducted to the point of weld on the worm by the welding rod and away from the worm by the many contacts which the worm has with the framework of my device through the guiding arm and the metallic troughing rolls. The framework, rolls, etc., are at the so-called "ground" potential in the electric welding circuit.

The submerged melt process of electric welding is preferred for use with the device of this invention. In this type of welding a granular type of weld material is fed from a hopper associated with the welding head and flows to the point of weld in sufficient quantities to cover the arc produced. The excess weld material falls away as the weld progresses and is caught in a funnel shaped receiver below the troughing rolls and delivered to a container from which it can be returned to the upper hopper.

It is seen that an object of this invention is to provide a worm welding device for a coal conveyor worm having a helical flight to be continuously welded to a cylindrical core in which the worm to be welded is carried on troughing rolls and rotated thereby and in which the progress of the worm under the welding head is caused by an adjustably fixed guide intercepting the flight of the worm and preventing the lateral displacement of the worm from its normal position on the rolls.

A particular object of this device is to eliminate the expensive set up time required for each worm by the devices of the prior art. It is seen that with the device of this invention, the worms may be fed one after the other onto the rolls from one end and that they will automatically pass continuously under the welding head and be welded and pass off the rolls at the other end.

Another object of this invention is to provide a welding head hingedly supported to fall repeatedly to a previously adjusted welding position after it has been tipped up for inspection or adjustment.

A further object is to mount the welding head for adjustable positioning longitudinally of the rolls so that, if desired, welding can be accomplished at any longitudinal position along the rolls.

How these and other objects are accomplished will be evident on reference to the following description and the attached drawings in which:

Fig. 1 is a perspective view of the complete device.

Fig. 2 is a vertical fragmentary section through the worm and troughing rolls adjacent the point of weld. The general location is shown at 2—2 in Fig. 3.

Fig. 3 is a plan view of a fragment of the partially welded worm at the location shown by 3—3 in Fig. 1.

Fig. 4 is a schematic plan view of the pair of troughing rolls showing how one worm after another can be placed for continuous welding.

Fig. 5 is a fragmentary vertical section through the table top and rolls at the point of weld and showing a funnel for collecting the excess weld material.

Fig. 6 is a vertical section along the line 6—6 of Fig. 3.

Like numerals denote like elements in the various figures of the drawings.

Referring now to the drawing, the reduced diameter ends of the troughing rolls 11 and 12 are shown journalled respectively in end brackets 13—14 and 15—16 secured to top 17 of the fixture table having supporting frame 18. A support 19 welded to top 17 carries a motor and speed reducer 20 driving rolls 11 and 12 through roller chain 21 and sprocket 22 fixed to the output shaft 23 of speed reducer 20, sprocket 24 fixed to the end of roll 11, sprocket 25 fixed to the end of roll 12 and idler sprocket 26 journalled in bracket 27 welded to top 17. Although not shown, idler sprocket 26 is vertically adjustable to take up the slack in the roller chain. The use of the idler also assures a more complete wrap of chain 21 about sprockets 24 and 25.

Uprights 28 and 29 welded to frame 18 carry across their upper ends the bar 30 parallel to rolls 11 and 12. Hinge member 31 is supported on bar 30 for adjustable longitudinal positioning thereon. Welder frame 32 is hinged to member 31 by hinge pin 33 and on its back side (not shown) it carries an adjustable stop abutting a fixed stop (not shown) on member 31.

The welder head shown generally as 34 is not detailed as to parts and function because this can be one of several such mechanisms now available on the market and as such it is not part of this invention except as to the combination. Head 34 is fixed to and is carried forwardly of frame 32 and since the greater part of the weight of the welder frame and head is forward of pin 33, the welder head will tip downwardly by gravity until stopped by the adjustable stop on frame 32 abutting the stationary stop on member 31. However, the welder head may be tipped upwardly as desired.

Welding rod 35 is automatically fed to the point of weld as required.

Weld material carried in hopper 36 is fed to the point of weld by the tube 37.

Electric weld current is fed to the welding head by conductor 38.

Worm flight 39 and core 40 are tack welded for proper assembly relation before being placed on troughing rolls 11 and 12 for continuous welding.

Guide 41 is adjustably positioned as shown on guide bracket 42 adjustably positioned on table top 17. As shown in Figs. 1, 2, 4 and 6, guide 41 extends over roll 11 and intercepts or extends into the space between flights 39 of the coal worm when it is in position on rolls 11 and 12. This extension of guide 41 has two working surfaces 43 and 44. In practice guide 41 is so adjusted in position that surface 44 bearing on core 40 would prevent the worm from being rolled out of position and surface 43 bearing on flight 39 causes the flight and core to progress longitudinally as the supporting rolls 11, 12 rotate the worm In this way the spiral weld of the flight to the core will always be properly located regardless of small irregularities of flight spacing or material dimensions.

Below the point of weld and schematically shown as set into table top 17 is funnel 45 which collects weld material dropping from the point of weld and discharges this material into a container 46 from which the material can be returned to the hopper in any desired way.

The table top and framework together with the roll supporting brackets and rolls and the guiding arm and its support are maintained at "ground" electrical potential thus assuring multiple paths of the lowest possible electrical resistance for the welding current leaving the worm through its contact with guide arm 41 and the many contacts of the flight with rolls 11 and 12. This is a distinct advantage in the worm welding device of this invention.

Having thus shown and described a preferred form of my invention, I claim:

1. A worm welding device for a coal conveyor worm having a helical flight to be continuously welded to a cylindrical core, comprising a table, a pair of spaced brackets extending upwardly from said table, a pair of spaced parallel rolls journalled in said brackets, said worm being supported longitudinally upon and between said rolls, means for driving said rolls in the same direction at the same surface speed, a welding head hingedly supported above said table means for adjustably positioning said welding head longitudinally of said rolls, means for adjustably positioning said welding head vertically of said rolls and an adjustably positioned guide carried on said table, said guide having an extension comprising means limiting the lateral displacement of said worm away from said rolls and means for causing the longitudinal progression of said worm with respect to said rolls as said rolls are rotated.

2. A worm welding device for a coal conveyor worm having a helical flight to be continuously welded to a cylindrical core, comprising a pair of horizontal laterally spaced parallel rolls for supporting said worm longitudinally thereon and therebetween, each of said rolls being journalled near its ends in fixed bearings, means for driving both said rolls in the same direction at the same surface speed, and an adjustably fixed worm guide having an extension, said extension comprising means limiting the lateral displacement of said worm away from said rolls and means for causing the longitudinal progression of said worm with respect to said rolls as said rolls are rotated.

3. A worm welding device for a coal conveyor worm having a helical flight to be continuously welded to a cylindrical core, comprising a pair of spaced parallel rolls arranged to rotate in the same direction at the same surface speed, said worm being supported longitudinally upon and between said rolls and an adjustably fixed guide intercepting said worm flight space, said guide comprising means limiting the lateral displacement of said worm away from said rolls and means for causing the longitudinal progression of said worm with respect to said rolls as said rolls are rotated.

4. In a device for welding the spiral flight to the core of a conveyor worm, a pair of horizontal parallel rolls for supporting said worm thereon and therebetween, means for simultaneously rotating both said rolls in the same direction at the same surface speed, means adapted to maintain said worm in its lateral position of contact with said rolls, and stationary means abutting said flight to progress said worm in an axial direction as said worm is rotated by frictional contact with said rotating rolls.

HASKELL C. CARTER.

REFERENCES CITED

The following references are of record in the file of this patent:

UNITED STATES PATENTS

| Number | Name | Date |
|---|---|---|
| 1,684,726 | Bowlus | Sept. 18, 1928 |
| 2,039,690 | Trainer | May 5, 1936 |